US011593371B2

(12) United States Patent
Cabrera Arevalo et al.

(10) Patent No.: US 11,593,371 B2
(45) Date of Patent: Feb. 28, 2023

(54) DYNAMICALLY LEARNING OPTIMAL COST PROFILES FOR HETEROGENOUS WORKLOADS

(71) Applicant: Teradata US, Inc., San Diego, CA (US)

(72) Inventors: Wellington Marcos Cabrera Arevalo, El Segundo, CA (US); Kassem Awada, Torrance, CA (US); Mahbub Hasan, Bellevue, WA (US); Allen N. Diaz, Santa Ana, CA (US); Mohammed Al-Kateb, Rancho Palos Verdes, CA (US); Awny Kayed Al-Omari, Cedar Park, TX (US)

(73) Assignee: Teradata US, Inc., San Diego, CA (US)

( * ) Notice: Subject to any disclaimer, the term of this patent is extended or adjusted under 35 U.S.C. 154(b) by 2 days.

(21) Appl. No.: 16/996,547

(22) Filed: Aug. 18, 2020

(65) Prior Publication Data

US 2021/0117422 A1    Apr. 22, 2021

Related U.S. Application Data

(60) Provisional application No. 62/924,062, filed on Oct. 21, 2019.

(51) Int. Cl.
G06F 16/24        (2019.01)
G06F 16/2453      (2019.01)
G06F 17/16        (2006.01)
G06F 16/28        (2019.01)
G06F 16/25        (2019.01)

(52) U.S. Cl.
CPC ...... *G06F 16/24542* (2019.01); *G06F 16/252* (2019.01); *G06F 16/284* (2019.01); *G06F 17/16* (2013.01)

(58) Field of Classification Search
None
See application file for complete search history.

(56) References Cited

U.S. PATENT DOCUMENTS

6,957,211 B1 * 10/2005 Tyulenev .......... G06F 16/24542
                                              707/718
7,636,735 B2   12/2009 Haas et al.
2003/0225768 A1 * 12/2003 Chaudhuri ............ G06F 16/284
(Continued)

*Primary Examiner* — Augustine K. Obisesan
(74) *Attorney, Agent, or Firm* — Gates & Cooper LLP (57) ABSTRACT

A relational database management system (RDBMS) accepts a workload comprised of one or more queries against a relational database. The RDBMS evolves a default cost profile into a plurality of cost profiles using fixed or dynamic evolution, wherein each of the cost profiles captures one or more cost parameters for the workload. The cost profiles are represented by a multi-dimensional matrix that has one or more dimensions, and each of the dimensions represents one of the cost parameters. The RDBMS dynamically determines which of the cost profiles is an optimal cost profile for the workload by mapping the cost profiles to the workload using a random walk scoring algorithm or a biased walk scoring algorithm that searches the multi-dimensional matrix to identify the optimal cost profile. The RDBMS selects and performs one or more query execution plans for the workload based on the optimal cost profile for the workload.

15 Claims, 10 Drawing Sheets

(56) References Cited

U.S. PATENT DOCUMENTS

| | | | |
|---|---|---|---|
| 2008/0120273 A1* | 5/2008 | Ramesh | G06F 16/24545 |
| 2009/0144235 A1* | 6/2009 | Bhide | G06F 16/24532 |
| 2010/0145929 A1* | 6/2010 | Burger | G06F 16/24545 |
| | | | 707/713 |
| 2011/0295840 A1* | 12/2011 | Ciaramita | G06F 16/2453 |
| | | | 707/719 |
| 2012/0191641 A1* | 7/2012 | Crupi | G06F 16/21 |
| | | | 707/602 |
| 2012/0191702 A1* | 7/2012 | Musial | G06F 16/2272 |
| | | | 707/719 |
| 2013/0226903 A1* | 8/2013 | Wu | G06F 16/24549 |
| | | | 707/719 |
| 2014/0214793 A1* | 7/2014 | Tatemura | G06F 16/2453 |
| | | | 707/713 |

* cited by examiner

DYNAMICALLY LEARNING OPTIMAL COST PROFILES FOR HETEROGENOUS WORKLOADS

CROSS REFERENCE TO RELATED APPLICATION

This application claims the benefit under 35 U.S.C. Section 119(e) of the following commonly-assigned applications:

U.S. Provisional Patent Application Ser. No. 62/924,062, filed on Oct. 21, 2019, by Wellington Marcos Cabrera Arevalo, and entitled "DYNAMICALLY LEARNING OPTIMAL COST PROFILES FOR HETEROGENOUS WORDLOADS,";

which application is incorporated by reference herein.

BACKGROUND OF THE INVENTION

1. Field of the Invention

This invention relates to methods and systems for dynamically learning optimal cost profiles for heterogenous workloads.

2. Description of Related Art (Note: This application references a number of different patents as indicated throughout the specification by one or more reference numbers within brackets [x]. A list of these different patents ordered according to these reference numbers can be found below in the section entitled "References." Each of these patents is incorporated by reference herein.)

Cost-based query optimizers are prevalent in commercial and open source databases for choosing the most efficient means of executing a query. [1,2] These optimizers use statistics collected about the accessed data to determine an optimal query execution plan for the query.

Cost-based query optimizers may also use cost profiles that capture cost parameters that are hardware performance metrics, such as I/O rate and network bandwidth. These cost parameters are typically captured statically when a system is being configured and deployed.

However, for systems running sophisticated workloads that are heterogeneous in nature, the use of static cost profiles may not be the best fit for all workloads. An optimization that works well for one workload that uses one combination of resources, may not work well for another workload that uses a different combination of resources. Moreover, workloads may vary considerably in their characteristics (e.g., read-intensive vs. write-intensive, CPU-bound vs. I/O-bound, etc.).

Moreover, if such systems are deployed in the cloud, or are deployed with on-demand capabilities, relying on the use of static cost profiles adds another challenge for the query optimizer to find the best query execution plans for a workload. Such systems may have resources that may be capped, tuned or changed over time.

Therefore, deploying and using static cost profiles for various system configurations and for heterogeneous workloads is deemed ineffective. There is a need in the art for improved methods and systems for dynamically learning optimal cost profiles for heterogenous workloads. The present invention satisfies this need.

SUMMARY OF THE INVENTION

The present invention is directed to a relational database management system (RDBMS) executing in a computer system, wherein: the RDBMS accepts a workload comprised of one or more queries against a relational database; the RDBMS evolves a default cost profile into a plurality of cost profiles, each of the cost profiles capturing one or more cost parameters for the workload; the RDBMS dynamically determines which of the plurality of cost profiles is an optimal cost profile for the workload; and the RDBMS selects and performs one or more query execution plans for the workload based on the optimal cost profile for the workload.

The plurality of cost profiles are represented by a multi-dimensional matrix that has one or more dimensions, and each of the dimensions represents one of the cost parameters.

The RDBMS evolves the default cost profile into the plurality of cost profiles using fixed or dynamic evolution, wherein fixed evolution involves generating one or more of the cost profiles that increment in steps in a range between minimum and maximum values of one of the cost parameters, and dynamic evolution involves generating one or more of the cost profiles by an auto calibration algorithm triggered upon changes on the hardware configuration, which re-measures the values of the cost parameters.

The RDBMS dynamically determines which of the plurality of cost profiles is the optimal cost profile for the workload by mapping the plurality of cost profiles to the workload. The plurality of cost profiles are mapped to the workload using a random walk scoring algorithm or a biased walk scoring algorithm that searches the multi-dimensional matrix to identify the optimal cost profile for the workload.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

In this invention, novel methods and systems are presented for dynamically learning cost profiles and assigning a cost profile to a given workload during run time. Specifically, the present invention provide methods and systems for dynamically learning optimal cost profiles for heterogenous workloads.

This invention evolves a default cost profile into a multidimensional matrix comprised of a plurality of different cost profiles, and then dynamically determines which of the plurality of cost profiles is an optimal cost profile for a workload. Specifically, this invention performs the following steps or functions:

1. Deploy a default cost profile for use with all queries and workloads.
2. Evolve the default cost profile into a multidimensional matrix comprised of a plurality of different cost profiles with different cost parameters.
3. For each workload, perform a random or biased "walk" in the multidimensional matrix to search for a new cost profile different from a current cost profile.
4. Perform the workload using the new cost profile and score the new cost profile accordingly.
5. Repeat steps 3 and 4 for each workload until the cost profile that is a best fit with the workload is identified as an optimal cost profile.

These and other aspects of the present invention are described in more detail below.

Hardware and Software Environment

Figure 1:
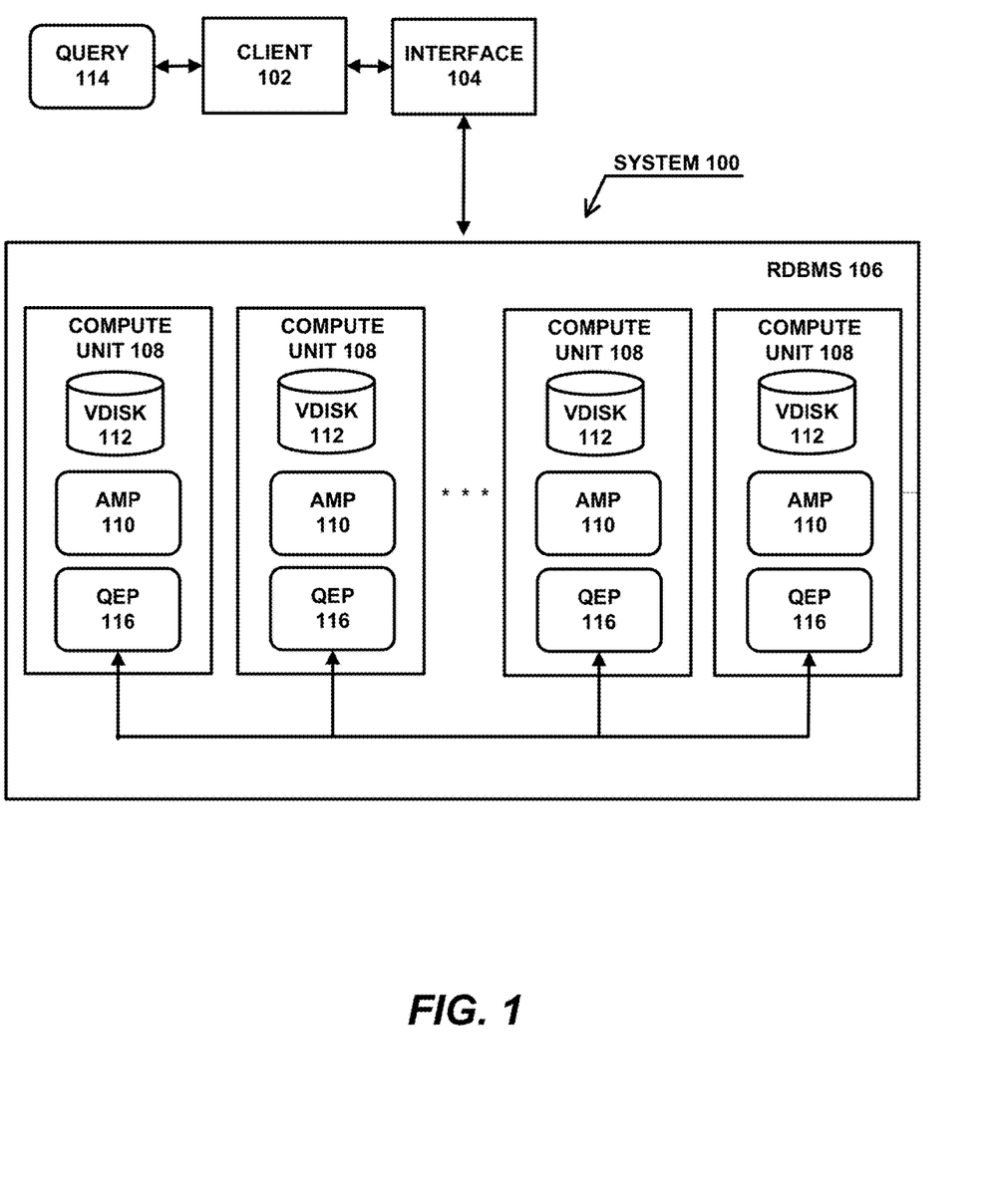
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system 100 implements a data warehouse in a three-tier client-server architecture, wherein the first or client tier provides clients 102 that may include, inter alia, a graphical user interface (GUI), the second or middle tier provides an interface 104 for interfacing with the data warehouse, and the third or server tier comprises the data warehouse, which is a Relational DataBase Management System (RDBMS) 106 that stores data and metadata in a relational database. The first, second, and third tiers may be implemented in separate computers, or may be implemented as separate or related processes in a single computer.

In the preferred embodiment, the RDBMS 106 is executed by one or more compute units 108, e.g., processors, and comprises one or more access module processors (AMPs) 110 performing the functions of the RDBMS 106 and one or more virtual disks (VDISKs) 112 storing the relational database of the RDBMS 106. The AMPs 110, and VDISKs 112, may be implemented in separate processors, or may be implemented as separate or related processes in a single processor.

The RDBMS 106 used in the preferred embodiment comprises the Teradata® RDBMS sold by Teradata™ US, Inc., the assignee of the present invention, although other DBMS's could be used. In this regard, Teradata® RDBMS is a hardware and software based data warehousing and analytic application/database system.

Generally, operators or users of the system 100 interact with the clients 102 to formulate a workload comprised of one or more queries 114 for the RDBMS 106, wherein the requests are transmitted via the interface 104 to the RDBMS 106, and responses are received therefrom. The RDBMS 106 performs the workload comprised of one or more queries 114 against a relational database comprised of one or more tables storing data. Specifically, the RDBMS 106 performs the functions described below, including accepting the workload comprised of the queries 114, generating one or more query execution plans (QEPs) 116 from the queries 114, and then performing the QEPs 116 to process data retrieved from the tables. Moreover, the results from these functions may be provided directly to clients 102, or may be provided to other systems (not shown) by the interface 104, or may be stored by the RDBMS 106 in the relational database.

Note that, in one or more embodiments, the system 100 may use any number of different parallelism mechanisms to take advantage of the parallelism offered by the multiple tier architecture, the client-server structure of the client 102, interface 104, and RDBMS 106, as well as the multiple compute nodes 108, AMPs 110 and VDISKs 112. Further, data within the relational database may be partitioned across the compute units 108, AMPs 110 and VDISKs 112 to provide additional parallelism.

In one embodiment, each of the compute units 108 manages a portion of the database that is stored in a corresponding one of the VDISKs 112. For example, the rows and/or columns of tables stored in the VDISKs 112 may be partitioned across the compute units 108 to ensure that workloads are distributed evenly across the compute nodes 108. The RDBMS 106 organizes the storage of data and the distribution of rows and/or columns of tables among the compute nodes 108. The RDBMS 106 also coordinates the execution of the QEPs 116 by the AMPs 110, and the retrieval of data from the VDISKs 112, in response to the queries 114 received from the clients 102.

Generally, the clients 102, interface 104, RDBMS 106, compute units 108, AMPs 110 and VDISKs 112 comprise hardware and/or software, including logic and/or data tangibly embodied in and/or accessible from a device, media, carrier, or signal, such as RAM, ROM, one or more of the data storage devices, and/or a remote system or device communicating with the computer system 100 via one or more data communications devices. The above elements 102-112 and/or operating instructions may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media. Accordingly, such articles of manufacture are readable by a computer and embody at least one program of instructions executable by a computer to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Query Processing

Figure 2:
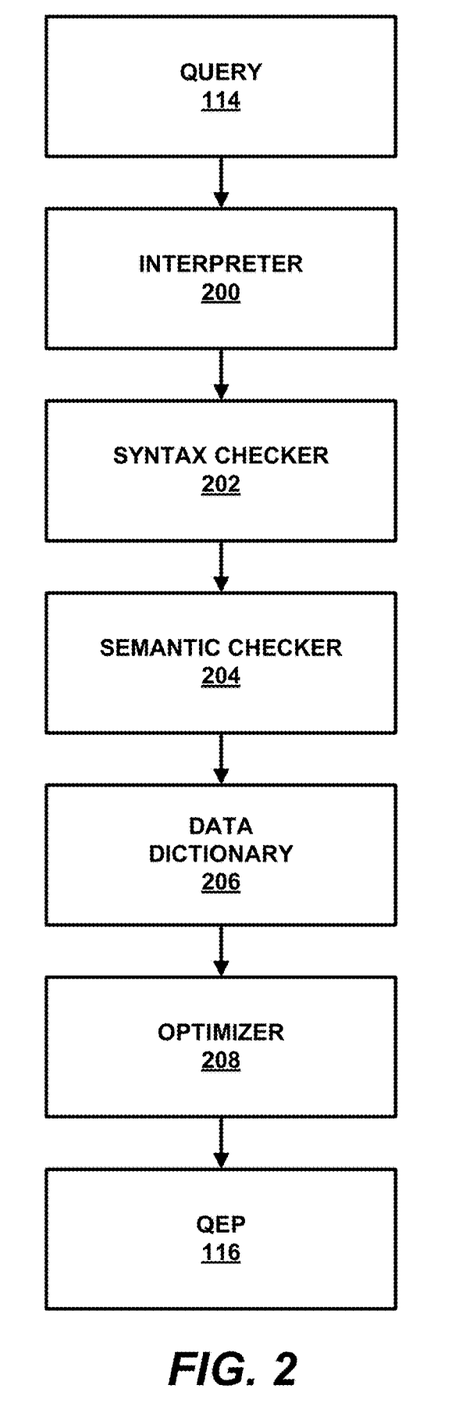
FIG. 2 illustrates the steps or functions performed when processing a query.

FIG. 2 illustrates the steps or functions performed by the RDBMS 106 when processing a query 114, which typically comprises one or more data manipulation language (DML) statements, such as structured query language (SQL) statements. An interpreter 200 interprets the query 114, a syntax checker 202 checks the query 114 for proper syntax, a semantic checker 204 evaluates the query 114 semantically, and consults a data dictionary 206 to ensure that all of the objects specified in the query 114 actually exist and that the user has the authority to perform the query 114. Finally, an optimizer 208 selects one or more QEPs 116 for the workload based on a plurality of cost profiles for the workload, wherein each of the cost profiles captures one or more cost parameters for the workload. This functionality is described in more detail below.

Evolving and Mapping Cost Profiles

This invention involves two key elements. The first element is that the RDBMS 106 evolves a default cost profile into the plurality of cost profiles in a controlled manner. The second element is that the RDBMS 106 then dynamically determines which of the plurality of cost profiles is an optimal cost profile for the workload.

First, the definition of a workload is described. Then, the methods for cost profile evolution and mapping, along with goodness of fit measures of cost profiles, are described.

Workload

This invention proposes to define a workload based on an n-tuple WLx=(Tag1, Tag2, . . . , Tagn) wherein WLx is the workload ID, and each Tagi for i=1 to n is an attribute such as an Account ID (AccID), Application ID (AppID), Department ID (DepID), etc., used to define one or more queries 114 with the workload WLx. With this idea, a workload can be tracked at different granularities. For example, if a workload is defined only based on AppID, then all queries 114 with the same AppID may form a single workload. The workload can have granularity to the query 114 level based on the literal text of the query 114 and/or the QEP 116 for the query 114.

In addition, there can be various ways of identifying different instances of the same workload. One example is to delimit a workload instance based on a time window, e.g., every hour, day, etc., is considered a start of a new instance of a given workload. Another example is to assume that the beginning and end of an instance of a given workload are tagged by the AccID and/or AppID, and can be detected accordingly to identify and separate different instances of the same workload.

Figure 3:
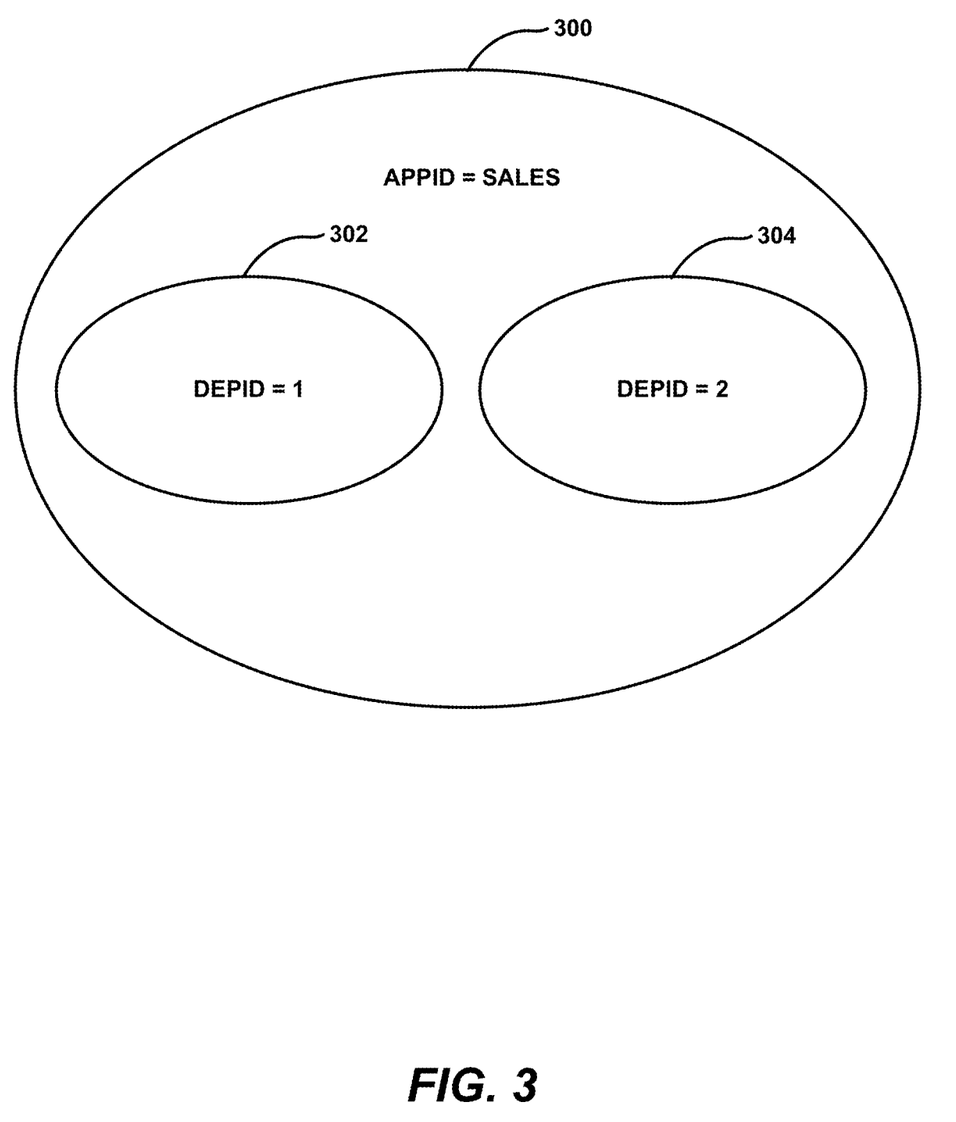
FIG. 3 is a set diagram illustrating the definition of workloads.

FIG. 3 is a set diagram illustrating the definition of workloads. Depending on how the workloads have been defined in a specific system, they could be either disjoint or intersecting sets of queries 114. In this example, there are three (3) workload classes, defined as WL1=(AppID=sales) 300, WL2=(AppID=sales, DepID=1) 302, and WL3= (AppID=sales, DepID=2) 304. Then, queries 114 classified as WL2 302 and WL 304 are also classified within WL1 300. A query 114 that is part of multiple workload classes 300, 302, 304 will be considered for the training of each of such intersecting workload classes 300, 302, 304.

Table 1 below illustrates examples for workload definitions, wherein the example shows disjoint workload definitions. Rows (R) 1, 2 and 5 in Table 1 represent a workload WL1 comprised of all queries 114 with tag AppID=sales; rows 3 and 7 in Table 1 represent a workload WL2 comprised of all queries 114 with tag AccID=report and AppID=bi; and row 8 in Table 1 represents a workload WL3 comprised of all queries 114 with tag AccID=u2 and AppID=credit. The remaining rows 4 and 6 in Table 1 are not classified as part of a workload.

TABLE 1

Examples of Workload Definitions

| R | WLx | AccID | AppID | Sample Query |
|---|-----|-------|-------|--------------|
| 1 | WL1 | u1 | sales | Select region, sum(v1) from sls1 join R where . . . |
| 2 | WL1 | u2 | sales | Select sum(val) from (select ordval from . . . |
| 3 | WL2 | report | bi | Select sum(tab.v1), min(tab.v), max(tab.y . . . |
| 4 |  | u3 | credit | Select id, zipcode, cated, cred_lim from t1, t2 . . . |
| 5 | WL1 | u2 | sales | Select sto from T where value < ( select sum( . . . |
| 6 |  | u4 | bi | Select * from A where c = 1 union all select . . . |
| 7 | WL2 | report | bi | Select sto, count(distinct prod) from order, t . . . |
| 8 | WL3 | u2 | credit | Select id, zipcode, cated, cred_lim from t1, t2 . . . |

Cost Profile Evolution

In one embodiment, the plurality of cost profiles are represented in the RDBMS 106 by a multi-dimensional matrix that has one or more dimensions, and each of the dimensions represents one of the cost parameters. The RDBMS 106 evolves the default cost profile into the multi-dimensional matrix comprised of the plurality of cost profiles using fixed or dynamic evolution. The evolution is intended to be controlled, so that there is a limited and controlled search space of the cost profiles in the matrix. At the same time, there should be no negative impact on running workloads, because workloads may use the base or default cost profile if necessary.

Fixed Evolution

In a fixed evolution, the RDBMS 106 evolves the default cost profile into the multi-dimensional matrix comprised of the plurality of cost profiles by generating one or more of the cost profiles that increment in steps in a range between minimum (min) and maximum (max) values of one of the cost parameters. The space searched for the optimal cost profile comprises the matrix and thus is constrained to cover the range between the minimum and maximum values of the cost parameter.

Although the cost profiles may comprise statistics collected about the accessed data, the cost profiles may also comprise hardware performance metrics. In one embodiment, two cost parameters are used, namely, I/O rate and network bandwidth, for the purposes of simplicity in the explanation and without loss of generality. Other embodiments may use more than two parameters and other embodiments may use parameters other than I/O rate and network bandwidth.

Figure 4:
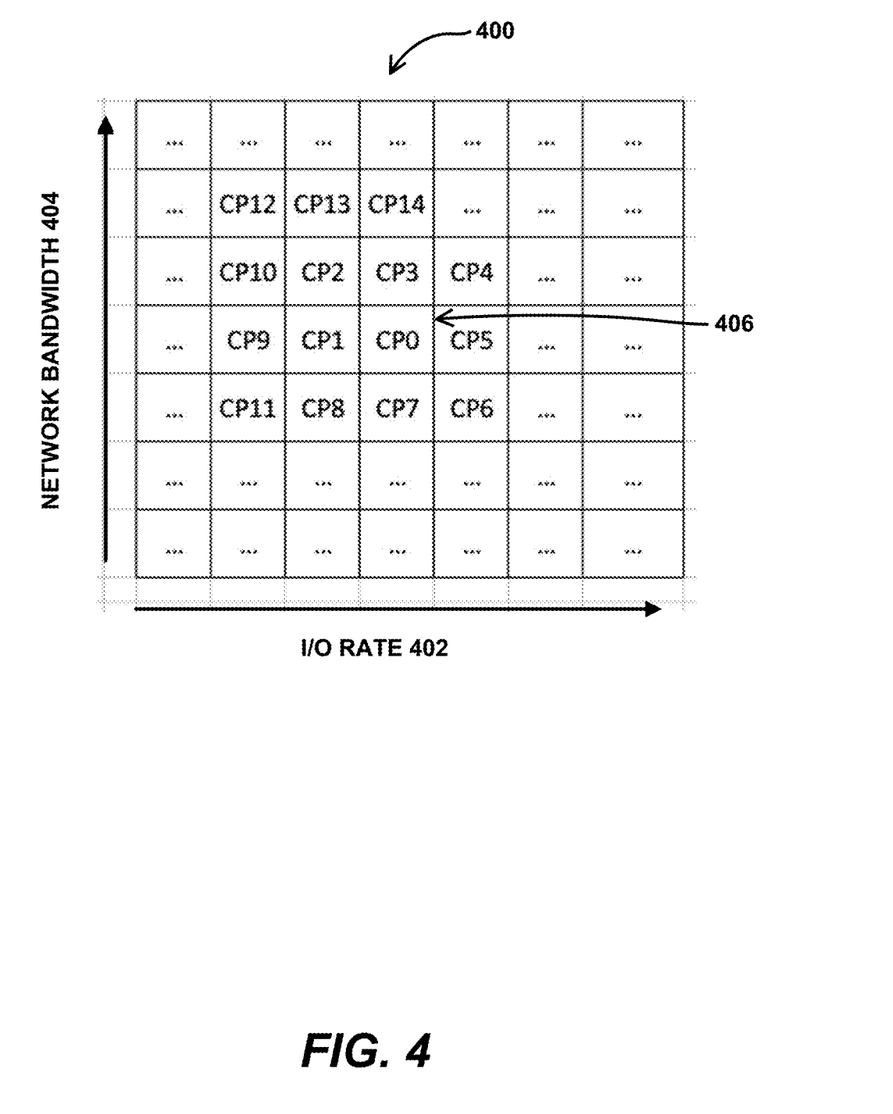
FIG. 4 is a two-dimensional cost profile matrix that illustrates fixed evolution of cost profiles.

FIG. 4 is a two-dimensional (2-D) cost profile matrix (CP-matrix) 400 that uses two cost parameters of I/O rate 402 (the x dimension) and network bandwidth 404 (the y dimension), with the arrows indicating the range from the minimum value to the maximum value of the cost parameters 402, 404 within the CP-matrix 400. The cost profiles 406 are labeled as CP0, . . . , CP14, and are positioned in the CP-matrix 400 according to the values of the cost parameters of I/O rate 402 and network bandwidth 404.

Figure 5:
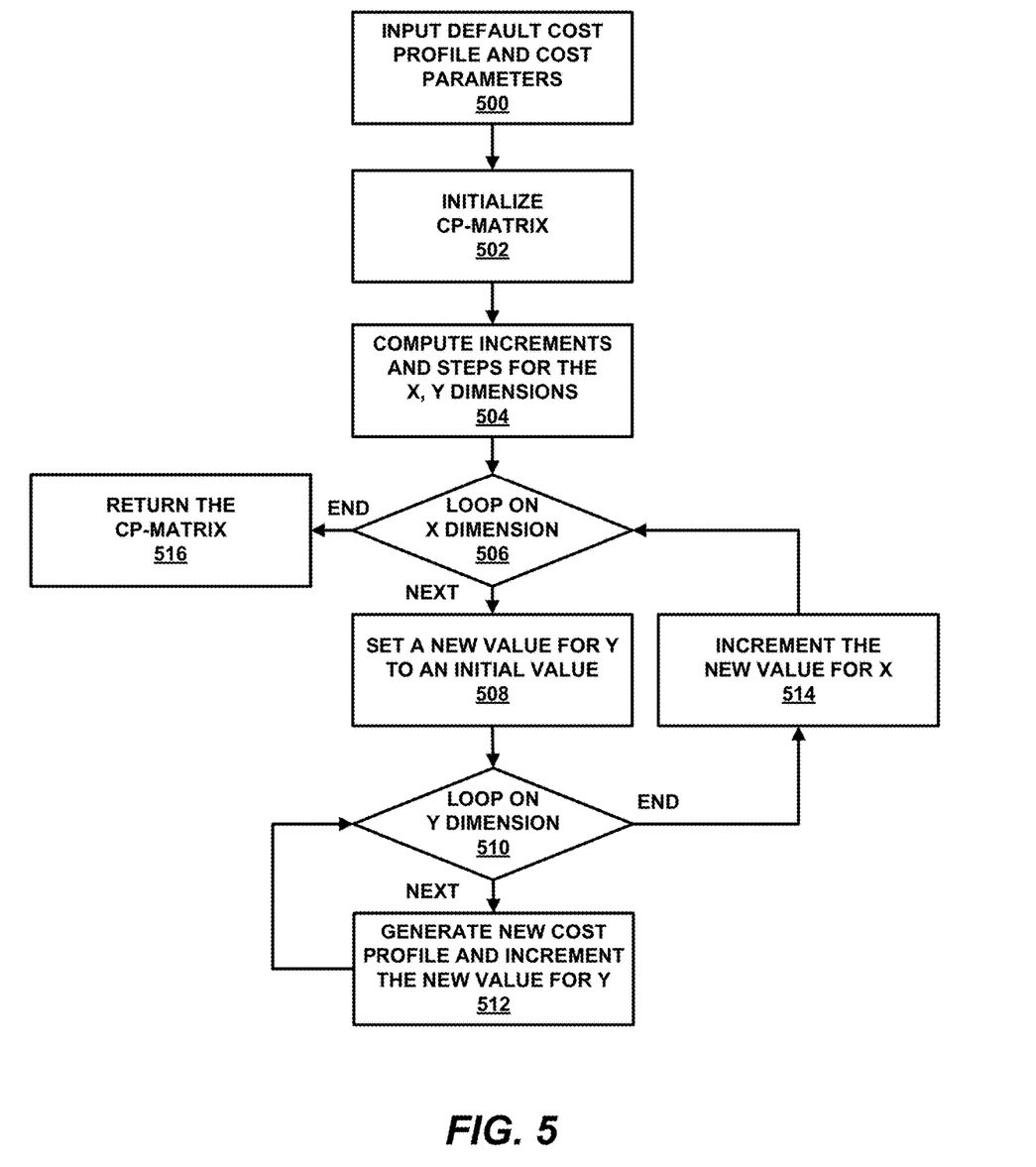
FIG. 5 is a flowchart for cost profile generation using fixed evolution.

FIG. 5 is a flowchart for cost profile generation using fixed evolution, resulting in the CP-matrix 400 of FIG. 4.

Block 500 represents a step or function of accepting as input a default cost profile CP0 and two or more cost parameters 402, 404 comprising dimensions of the CP-matrix 400. In other embodiments, there may be more than two cost parameters resulting a CP-matrix having more than two dimensions.

Block 502 represents a step or function of initializing the CP-matrix 400 as empty.

Block 504 represents a step or function of computing an increment for each of the cost parameters 402, 404 based on a range of minimum and maximum values for each cost parameter 402, 404. Specifically, this includes computing a number of steps in each of the dimensions of the CP-matrix 400.

Block 506 represents a step or function of performing a loop for the x dimension, wherein the loop increments the cost parameter 402 from the minimum value to the maximum value using the steps of the dimension. For each loop, control transfers to Block 508; upon completion of the loop, control transfers to Block 516.

Block 508 represents a step or function of setting a new value for y (cost parameter 404) to an initial value.

Block 510 represents a step or function of performing a loop for the y dimension, wherein the loop increments the cost parameter 404 from the minimum value to the maximum value using the steps of the dimension. For each loop, control transfers to Block 512; upon completion of the loop, control transfers to Block 514.

Block 512 represents a step or function of generating a new cost profile CPx 406 from the default cost profile CP0 406, wherein the x value (cost parameter 402) is set to the new value of x, they value (cost parameter 404) is set to the new value of y, the new cost profile CPx 406 is added to the CP-matrix 404, and the new value of y is incremented by the y increment. Thereafter control transfers to Block 510.

Block 514 represents a step or function of incrementing the new value of x by the x increment. Thereafter control transfers to Block 506.

Block 516 represents a step or function of returning the CP-matrix 400, namely, outputting the CP-matrix 400 of new cost profiles 406 with varied cost parameter values 402, 404.

Dynamic Evolution

In a dynamic evolution, the RDBMS 106 evolves the default cost profile into the multi-dimensional matrix comprised of the plurality of cost profiles by generating one or more of the cost profiles by using an auto calibration algorithm, which re-measures the values of the cost parameters. Again, the space searched for the optimal cost profile comprises the matrix and thus is constrained to cover the range between the minimum and maximum values of the cost parameter.

In one embodiment, an auto-calibration algorithm is implemented in the RDBMS 106, wherein the auto-calibration algorithm is triggered to re-measure cost parameters in the cost profile upon any change in hardware configuration. If a cost parameter changes above certain threshold (which can be user or system defined), the value of this cost parameter is adjusted, and a new cost profile is generated.

For example, if the number of disk arrays is doubled in the system 100, the auto-calibration algorithm is triggered and I/O rates for read and write are re-measured. If the new rates change from the existing rates (above a user or system defined threshold), cost parameters of I/O rates for read and write are updated, and the existing cost profile evolves to a new one.

Figure 6:
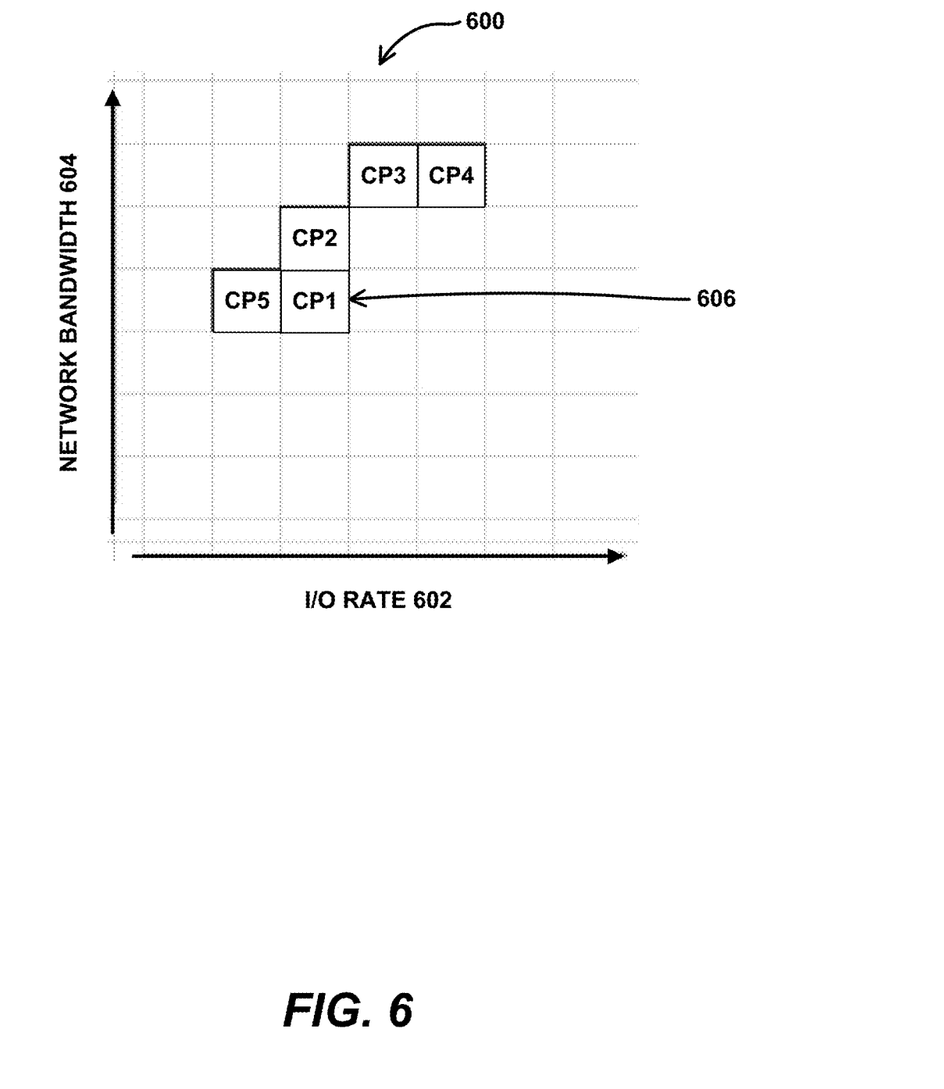
FIG. 6 is a two-dimensional cost profile matrix that illustrates dynamic evolution of cost profiles.

FIG. 6 is a two-dimensional CP-matrix 600 that illustrates the dynamic evolution using two cost parameters of I/O rate 602 and network bandwidth 604, with the arrows indicating the range from the minimum value to the maximum value of the cost parameters 602, 604. The cost profiles 606 are labeled as CP1, . . . , CP5, and are positioned in the CP-matrix 600 according to the values of the cost parameters of I/O rate 602 and network bandwidth 604. The CP-matrix 600 of FIG. 6 is noticeably more sparse than the CP-matrix 400 of FIG. 4.

Cost Profile Mapping

In one embodiment, the RDBMS 106 dynamically determines which of the plurality of cost profiles is the optimal cost profile for the workload. The assignment of a workload to a cost profile is also named "mapping". The plurality of different cost profiles are mapped to the workload using a random walk scoring algorithm or a biased walk scoring algorithm that searches the multi-dimensional matrix to identify the optimal cost profile for the workload.

Figure 7:
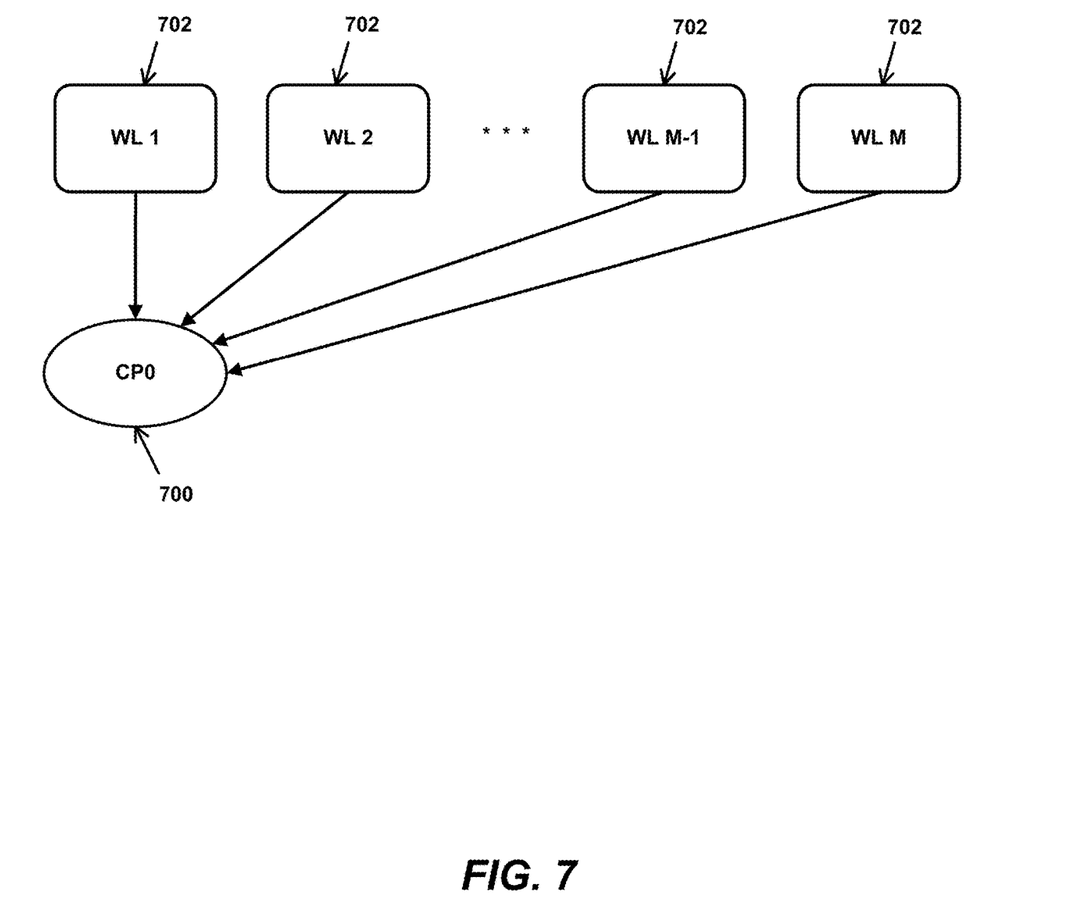
FIG. 7 illustrates an initial mapping of all workloads to a default cost profile.

FIG. 7 illustrates that this invention starts with a default cost profile CP0 700 that maps to all workloads WL1, WL2, . . . , WL M–1, WL M 702.

Figure 8:
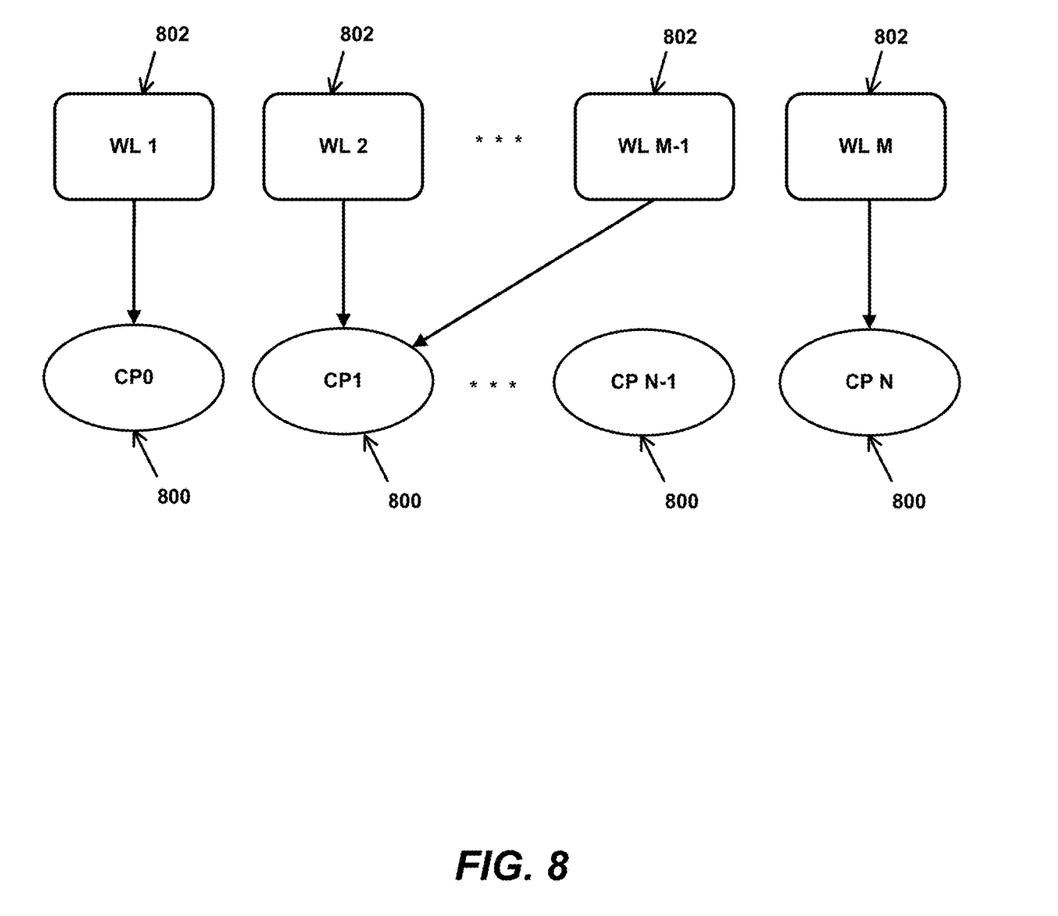
FIG. 8 illustrates a subsequent mapping of workloads to a plurality of different cost profiles evolved from the default cost profile.

FIG. 8 illustrates the mapping between cost profiles CP0, CP1, . . . , CP N–1, CP N 800 and workloads WL1, WL2, WL M–1, WL M 802, with the evolution of the default cost profile CP0 800 to a plurality of different cost profiles CP1, . . . , CP N–1, CP N 800. In this context, the default cost profile CP0 800 is considered to be the most conservative cost profile, while the cost profile CP N 800 is considered to be the most aggressive cost profile. The mapping relationships between the workloads WL1, WL2, WL M–1, WL M 802 and the cost profiles CP0, CP1, . . . , CP N–1, CP N 800 may comprise many-to-one, one-to-one and/or none-to-none.

Random Walk Scoring

The key idea of mapping cost profiles CPx to workloads WLx may use a random walk scoring algorithm as a learning algorithm to find the optimal cost profile CPx for a defined workload WLx.

Figure 9:
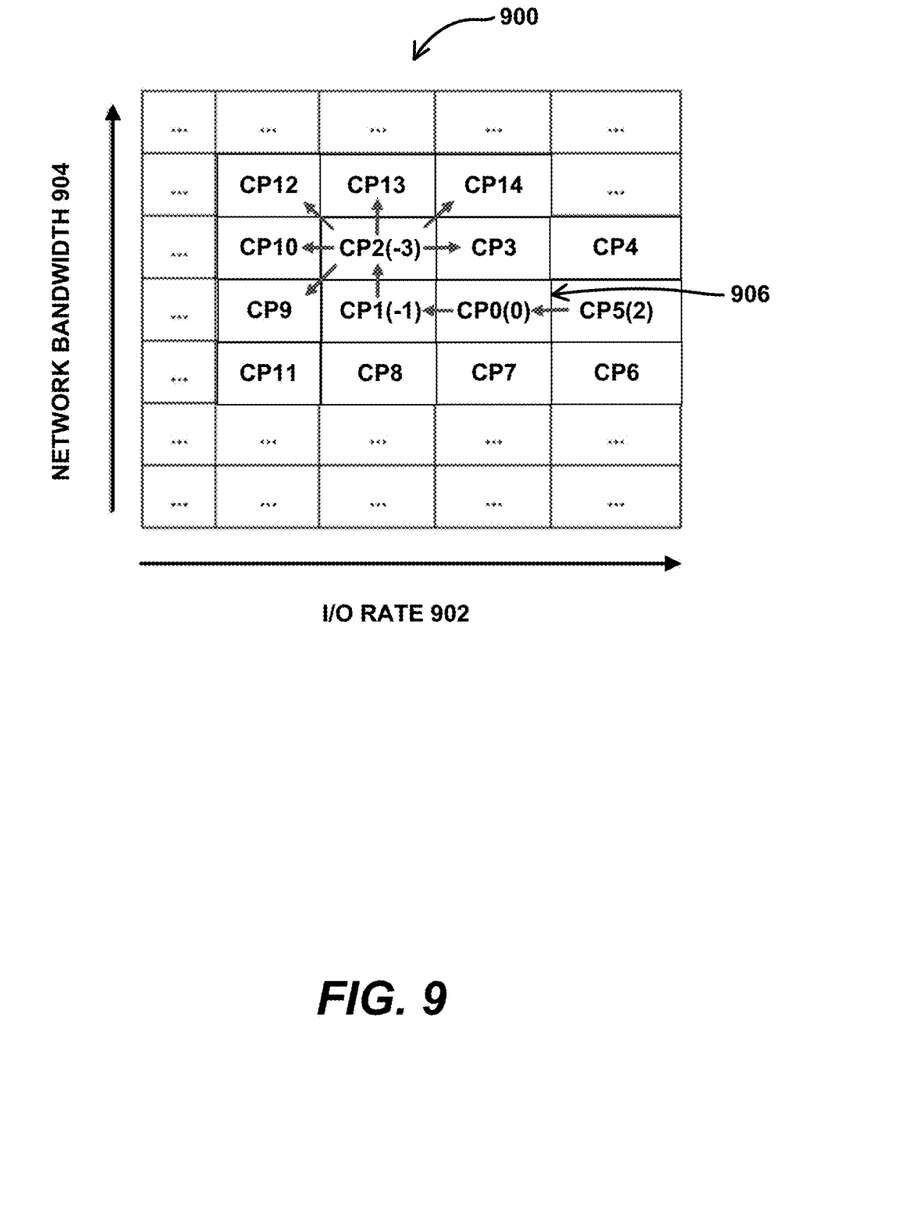
FIG. 9 illustrates how a learning algorithm works with the cost profile matrix.

FIG. 9 is a two-dimensional CP-matrix 900 that illustrates the random walk scoring algorithm using two cost parameters of I/O rate 902 and network bandwidth 904, with the arrows indicating the range from the minimum value to the maximum value of the cost parameters 902, 904. The cost profiles 906 are labeled as CP0, . . . , CP14, and are positioned in the CP-matrix 900 according to the values of the cost parameters of I/O rate 902 and network bandwidth 904.

The CP-matrix 900 represents the search space, and a search moves one step along each dimension 902, 904 each time it examines a cost profile CPx 906 for an instance of a workload WLx.

The base or default cost profile 906 is denoted as CP0 and is initially the current cost profile 906. When the RDBMS 106 finishes the execution of all the queries 114 in the first instance of WLx, the cost of the individual queries 114 in this workload WLx instance are aggregated to compute its execution cost (the summation of the costs of all the queries 114 in a specific workload WLx instance). The default cost profile CP0 906 is assigned a neutral cost of (0).

For a new instance or occurrence of the same workload WLx, the search randomly chooses one of the unvisited neighbor cost profiles CPx 906 of the current cost profile CPx 906 as the next cost profile. If the cost of the next cost profile CPx 906 is better than current cost profile CPx 906, then the next cost profile CPx 906 would be assigned a higher score and the next cost profile CPx 906 becomes the current cost profile CPx 906, for the purposes of continuing the search; otherwise, the next cost profile CPx 906 is assigned a lower score, and the next cost profile CPx 906 does not become the current cost profile CPx 906, e.g., the search does not "walk" to the next cost profile CPx 906. In either case, the next cost profile CPx 906 is marked as visited.

In the example of FIG. 9, the base or default cost profile CP0 906 is initially the current cost profile with a neutral cost of (0). For a new instance or occurrence of the same workload WLx, the search randomly chooses one of the unvisited neighbor cost profiles, e.g., CP5 906, of the current cost profile CP0 906 as the next cost profile 906. The cost (2) of the next cost profile CP5 906 is worse than the cost (0) of the current cost profile CP0 906, so the next cost profile CP5 906 is assigned a lower score, and the next cost profile CP5 906 does not become the current cost profile 906, e.g., the search does not "walk" to the next cost profile CP5 906, but the next cost profile CP5 906 is marked as visited.

The search randomly chooses one of the unvisited neighbor cost profiles, e.g., CP1 906 of the current cost profile CP0 906 as the next cost profile 906. The cost (−1) of the next cost profile CP1 906 is better than the cost (0) of the current cost profile CP0 906, so the next cost profile CP1 906 is assigned a higher score and the next cost profile CP1 906 becomes the current cost profile CP1 906, for the purposes of continuing the search, e.g., the search "walks" to the next cost profile CP1 906. In addition, the next cost profile CP1 906 is marked as visited.

The search randomly chooses one of the unvisited neighbor cost profiles, e.g., CP2 906, of the current cost profile CP1 906 as the next cost profile 906. The cost (−3) of the next cost profile CP2 906 is better than the cost (−1) of the current cost profile CP1 906, so the next cost profile CP2 906 is assigned a higher score and the next cost profile CP2 906 becomes the current cost profile CP2 906, for the purposes of continuing the search, e.g., the search "walks" to the next cost profile CP2 906. In addition, the next cost profile CP2 906 is marked as visited.

These steps continue, as the search randomly chooses one of the unvisited neighbor cost profiles 906, e.g., CP3, CP9, CP10, CP12, CP13, CP14, of the current cost profile CP2 906 as the next cost profile 906, until the search visits all of the cost profiles 906 in the CP-matrix 900 to determine the optimal cost profile 906 among the cost profiles 906 in the CP-matrix 900.

Figure 10:
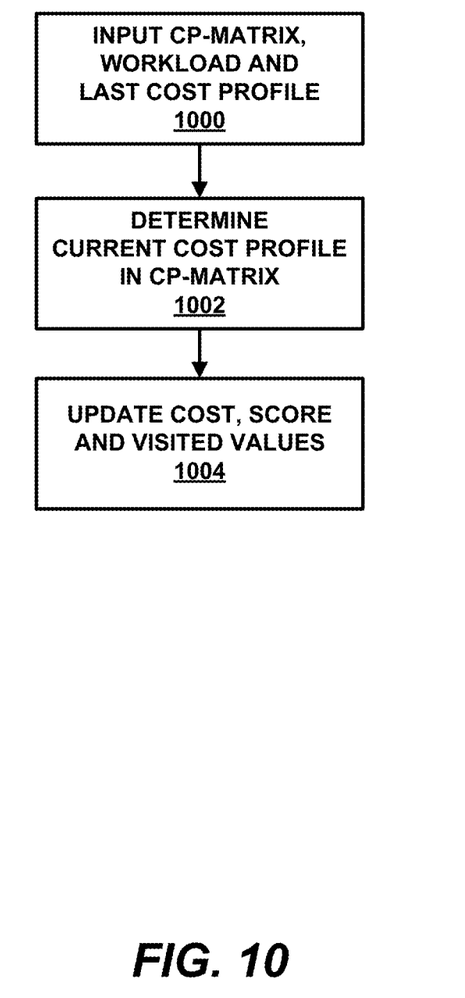
FIG. 10 is a flowchart for a random walk scoring algorithm used with the cost profile matrix.

FIG. 10 is a flowchart for a random walk scoring algorithm, which is executed every time there is an instance of the same workload WLx, but which adds negligible overhead to the workload WLx.

Block 1000 represents a step or function of accepting as input a CP-matrix 900 with one or more cost profiles CPx 906 having metadata attributes Cost, Score and Visited; a workload (WLx) having metadata attributes ExecutionCost and LastCostProfile; and a last cost profile (lastCP) value which is set to WLx.LastCostProfile.

Block 1002 represents a step or function of determining a current cost profile CurrCP 906 in the CP-matrix 900. If the WLx.LastCostProfile has not been initialized, then the CurrCP 906 is set to CP0 906; else, if there exists any un-visited neighbor of lastCP, then CurrCP 906 is set to a random un-visited neighbor of lastCP; else, if there exists any un-visited cost profiles in the space, then the CurrCP 906 is set to a close unvisited cost profile 906 in the CP-matrix 900; else, the CurrCP 906 is set to a minimum scored cost profile 906 from the CP-matrix 900.

Block 1004 represents a step or function of setting the values for CurrCP.Cost, CurrCP.Score and CurrCP.Visited. Specifically, CurrCP.Cost is set to WLx.ExecutionCost; CurrCP.Score is set to (CurrCP.Cost−CP0.Cost)/CP0.Cost; and CurrCP.Visited is set to True. If CurrCP.Score is better than WLx.LastCostProfile.Score, then WLx.LastCostProfile is set to CurrCP.

Biased Walk Scoring

An alternative to the random walk scoring algorithm would be a biased walk scoring algorithm for unvisited cost profiles 906 in the CP-matrix 900. The probability of picking an unvisited cost profile 906 can be computed, for example, using a Boltzmann distribution with a temperature being measured as a standard deviation of scores of visited neighboring cost profiles 906 (if any).

Execution Cost

To measure cost, this invention aggregates performance metrics for all queries 114 in the same workload WLx. Performance metrics typically include I/O, CPU time, etc. These metrics can be considered with equal or weighted values.

REFERENCES

The following patents are incorporated by reference herein:

[1] U.S. Pat. No. 6,957,211, issued Oct. 18, 2005, to Mikhail Tyulenev, Hakan Jakobsson and Mohamed Ziauddin, and entitled "Query optimizer cost model.".

[2] U.S. Pat. No. 7,636,735, issued Dec. 22, 2009, to Peter Jay Haas, Vanja Josifovski, Guy Maring Lohman and Chun Zhang, and entitled "Method for estimating the cost of query processing."

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented apparatus, comprising:
a computer system; and
a relational database management system (RDBMS) executed by the computer system, wherein:
the RDBMS accepts a workload comprised of one or more queries against a relational database;
the RDBMS evolves a default cost profile into a plurality of different cost profiles represented by a multi-dimensional matrix that has one or more dimensions using fixed or dynamic evolution, each of the plurality of different cost profiles capturing one or more cost parameters for the workload, and each of the dimensions of the multi-dimensional matrix representing one of the cost parameters;

the RDBMS dynamically determines which of the plurality of different cost profiles represented by the multi-dimensional matrix is an optimal cost profile for the workload by mapping the plurality of different cost profiles to the workload using a scoring algorithm that searches the multi-dimensional matrix for the optimal cost profile for the workload; and the RDBMS selects and performs one or more query execution plans for the workload based on the optimal cost profile for the workload.

2. The apparatus of claim 1, wherein the RDBMS evolves the default cost profile into the plurality of different cost profiles using fixed evolution, by generating one or more of the plurality of different cost profiles that increment in steps in a range between minimum and maximum values of one of the cost parameters.

3. The apparatus of claim 1, wherein the RDBMS evolves the default cost profile into the plurality of different cost profiles using dynamic evolution, by generating one or more of the plurality of different cost profiles that re-measure a value of one of the cost parameters.

4. The apparatus of claim 1, wherein the plurality of different cost profiles are mapped to the workload using a random walk scoring algorithm that searches the multi-dimensional matrix to identify the optimal cost profile for the workload.

5. The apparatus of claim 1, wherein the plurality of different cost profiles are mapped to the workload using a biased walk scoring algorithm that searches the multi-dimensional matrix to identify the optimal cost profile for the workload.

6. A computer-implemented method, comprising:
executing, in a computer system, a relational database management system (RDBMS), wherein:
the RDBMS accepts a workload comprised of one or more queries against a relational database;
the RDBMS evolves a default cost profile into a plurality of different cost profiles represented by a multi-dimensional matrix that has one or more dimensions using fixed or dynamic evolution, each of the plurality of different cost profiles capturing one or more cost parameters for the workload, and each of the dimensions of the multi-dimensional matrix representing one of the cost parameters;
the RDBMS dynamically determines which of the plurality of different cost profiles represented by the multi-dimensional matrix is an optimal cost profile for the workload by mapping the plurality of different cost profiles to the workload using a scoring algorithm that searches the multi-dimensional matrix for the optimal cost profile for the workload; and
the RDBMS selects and performs one or more query execution plans for the workload based on the optimal cost profile for the workload.

7. The method of claim 6, wherein the RDBMS evolves the default cost profile into the plurality of different cost profiles using fixed evolution, by generating one or more of the plurality of different cost profiles that increment in steps in a range between minimum and maximum values of one of the cost parameters.

8. The method of claim 6, wherein the RDBMS evolves the default cost profile into the plurality of different cost profiles using dynamic evolution, by generating one or more of the plurality of different cost profiles that re-measure a value of one of the cost parameters.

9. The method of claim 6, wherein the plurality of different cost profiles are mapped to the workload using a random walk scoring algorithm that searches the multi-dimensional matrix to identify the optimal cost profile for the workload.

10. The method of claim 6, wherein the plurality of different cost profiles are mapped to the workload using a biased walk scoring algorithm that searches the multi-dimensional matrix to identify the optimal cost profile for the workload.

11. A computer program product, the computer program product comprising a non-transitory computer readable storage medium having program instructions embodied therewith, the program instructions executable by a computer system to cause the computer system to perform a method, comprising:
executing a relational database management system (RDBMS) in the computer system, wherein:
the RDBMS accepts a workload comprised of one or more queries against a relational database;
the RDBMS evolves a default cost profile into a plurality of different cost profiles represented by a multi-dimensional matrix that has one or more dimensions using fixed or dynamic evolution, each of the plurality of different cost profiles capturing one or more cost parameters for the workload, and each of the dimensions of the multi-dimensional matrix representing one of the cost parameters;
the RDBMS dynamically determines which of the plurality of different cost profiles represented by the multi-dimensional matrix is an optimal cost profile for the workload by mapping the plurality of different cost profiles to the workload using a scoring algorithm that searches the multi-dimensional matrix for the optimal cost profile for the workload; and
the RDBMS selects and performs one or more query execution plans for the workload based on the optimal cost profile for the workload.

12. The computer program product of claim 11, wherein the RDBMS evolves the default cost profile into the plurality of different cost profiles using fixed evolution, by generating one or more of the plurality of different cost profiles that increment in steps in a range between minimum and maximum values of one of the cost parameters.

13. The computer program product of claim 11, wherein the RDBMS evolves the default cost profile into the plurality of different cost profiles using dynamic evolution, by generating one or more of the plurality of different cost profiles that re-measure a value of one of the cost parameters.

14. The computer program product of claim 11, wherein the plurality of different cost profiles are mapped to the workload using a random walk scoring algorithm that searches the multi-dimensional matrix to identify the optimal cost profile for the workload.

15. The computer program product of claim 11, wherein the plurality of different cost profiles are mapped to the workload using a biased walk scoring algorithm that searches the multi-dimensional matrix to identify the optimal cost profile for the workload.

* * * * *